United States Patent
Braeuer et al.

(10) Patent No.: US 9,486,876 B2
(45) Date of Patent: Nov. 8, 2016

(54) APPARATUS TO LOAD ELECTRODE CAP MAGAZINES

(71) Applicant: BRÄUER SYSTEMTECHNIK GMBH

(72) Inventors: Andreas Braeuer, Annaberg-Buchholz (DE); Markus Beyer, Elterlein Ot Schwarzbach (DE); Rene Seipt, Annaberg-Buchholz (DE)

(73) Assignee: Braeuer Systemtechnik GmbH, Mildenau (DE)

( * ) Notice: Subject to any disclaimer, the term of this patent is extended or adjusted under 35 U.S.C. 154(b) by 144 days.

(21) Appl. No.: 14/369,827

(22) PCT Filed: Dec. 13, 2012

(86) PCT No.: PCT/EP2012/005140
§ 371 (c)(1),
(2) Date: Jun. 30, 2014

(87) PCT Pub. No.: WO2014/063721
PCT Pub. Date: May 1, 2014

(65) Prior Publication Data
US 2015/0139763 A1    May 21, 2015

(30) Foreign Application Priority Data

Oct. 24, 2012  (DE) .................. 10 2012 020 854

(51) Int. Cl.
*B23K 11/30* (2006.01)
(52) U.S. Cl.
CPC ................. *B23K 11/3072* (2013.01)

(58) Field of Classification Search
CPC .................. B23K 11/318; B23K 11/3072
See application file for complete search history.

(56) References Cited

U.S. PATENT DOCUMENTS

| | | | |
|---|---|---|---|
| 3,944,062 A | 3/1976 | Keller | |
| 8,100,119 B2* | 1/2012 | Hall | 124/71 |
| 2003/0106878 A1* | 6/2003 | Sundstrom | 219/86.8 |
| 2011/0042406 A1* | 2/2011 | Nakajima et al. | 221/244 |
| 2015/0375333 A1* | 12/2015 | Kaeseler | 221/23 |

FOREIGN PATENT DOCUMENTS

| | | |
|---|---|---|
| DE | 102005038189 A1 | 2/2007 |
| DE | 102007041505 B3 | 1/2009 |

* cited by examiner

*Primary Examiner* — Gene Crawford
*Assistant Examiner* — Kelvin L Randall, Jr.
(74) *Attorney, Agent, or Firm* — Laurence A. Greenberg; Werner H. Stemer; Ralph E. Locher

(57) ABSTRACT

A device for rotating, positioning, and introducing electrode caps for welding electrodes into a magazine. A rotating electrode cap channel is connected to a spiral conveyor. The electrode caps stand on a cap end-face provided with a bore on the spiral conveyor end, and they are rotated by 90°. The other end of the rotating electrode cap channel is arranged relative to the upper end of the guiding shaft such that vibrations of the spiral conveyor are not transmitted to the rest of the system. The openings of the rotating electrode cap channel and the guiding shaft are arranged relative to one another such that the electrode caps can be reliably transferred, and the guiding shaft is connected to the magazine filling unit at the lower end of the guiding shaft. The magazine connection has locking lever sensors, which detect the correct fit of the magazine.

15 Claims, 4 Drawing Sheets

APPARATUS TO LOAD ELECTRODE CAP MAGAZINES

BACKGROUND OF THE INVENTION

Field of the Invention

The invention relates to an apparatus to rotate, position, and feed electrode caps for welding electrodes into a dedicated magazine designed to hold 5 electrode caps. Such electrode cap magazines are used to equip welding robots.

Dot-welding is a commonly employed technique for joining pieces of sheet metal most notably in the production of autobodies on automatic assembly lines in the automobile industry. Sheet metal autobody components are usually joined with the help of welding robots. These robots mount welding tongs the arms of which are fitted with a dot-welding electrode, the so-called electrode cap. The welding tongs are brought close to the positioned sheet metal components to be welded together. Precise positioning of the welding tong and the sheet metal components to be welded is done automatically with computer assistance. On automated assembly lines of this type, the welding process takes place at as high a rate as possible and without interruption. This causes the electrode caps to wear out rapidly as the contact areas of the caps engage the autobody components to be welded together.

During the welding process, there is a flow of electric current between the electrode caps through the adjoining autobody sheet metal parts to be welded together, causing the electrode caps' contact zones to deteriorate.

Frequently, the contact areas will form burn-off bulges along the edges which increase the surface area of the contact zone and thus entail changes in the welding conditions.

To avoid having to counter this effect by stepping up the amperage to uneconomical levels, the electrode caps are reworked by milling at periodic intervals and as required by the workload and the resulting warping.

After a specified number of rework cycles, the electrode caps will have lost so much material that they need to be replaced. For this purpose, the worn-out electrode caps are pulled off from the welding electrode shafts. Fitting of the welding electrode shafts with new unused electrode caps usually relies on single-conduit magazines.

These magazines are arranged so that the welding tongs can pick up new electrode caps by locking in a particular position and fasten the caps to the welding electrode shaft by pinching the welding tong arms.

The magazines must be mounted in a defined position for them to be approached by the welding tongs, which means that the magazines have to be left in place and manually refilled in situ.

Normally, the welding process has to be stopped for this because no personnel will be allowed into the danger zone of the active robots, which precludes any refilling without interrupting the operation.

Changer magazines have been developed to address this issue.

For instance, DE 199 05 477 outlines a magazine designed to hold welding electrode caps in particular for welding tongs fitted to welding robots. According to the present patent specification, the required electrode caps are stored in precisely fitting guides in a so-called magazine.

The cap guides and their discharge outlets are mounted parallel with the longitudinal axis of the magazine. In addition, the discharge outlet opens in the welding tong's direction of access in such a way that the welding caps are positioned one at a time with their opening pointing into the direction of access and lie unobstructed across their entire length.

However, this approach does not remedy the disadvantage of having to interrupt operations because the coordinates of the welding tong's movements must be re-programmed after mounting a new magazine.

The state of the art is that magazines must be stored fully loaded to allow for quick replacement inside the robot cell. It is usual practice to load the magazines by hand.

The purpose of the invention is to propose an apparatus to rotate, position and feed electrode caps for welding electrodes into a dedicated electrode cap magazine, which is designed to circumvent most problems associated with existing solutions, and particularly to ensure process safety.

BRIEF SUMMARY OF THE INVENTION

According to the invention, this problem is solved by an apparatus as claimed.

BRIEF DESCRIPTION OF THE SEVERAL VIEWS OF THE DRAWING

The apparatus will be discussed in detail with the help of figures one to four and an illustrative embodiment.

FIG. 3 presents an explosion drawing of the inventive apparatus 3 in disengaged state without magazine 15, while

DESCRIPTION OF THE INVENTION

Figure 1:
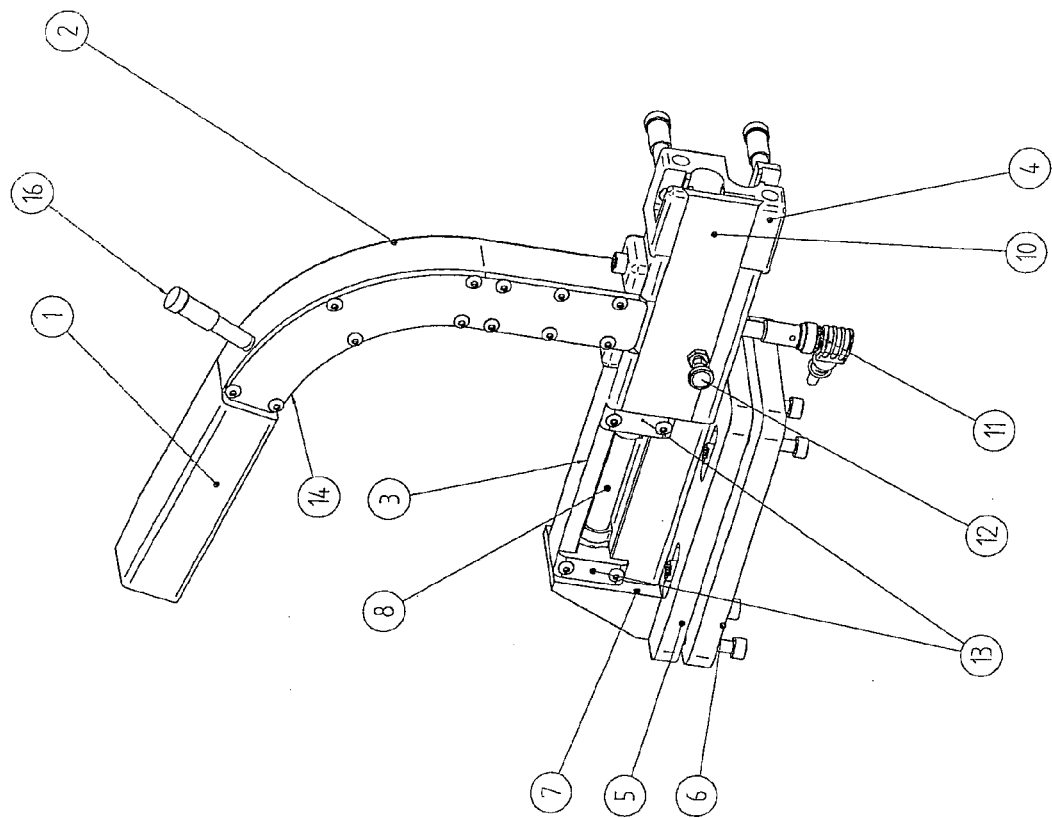
FIG. 1 shows the inventive apparatus 3 in disengaged state without magazine 15.
Figure 2:
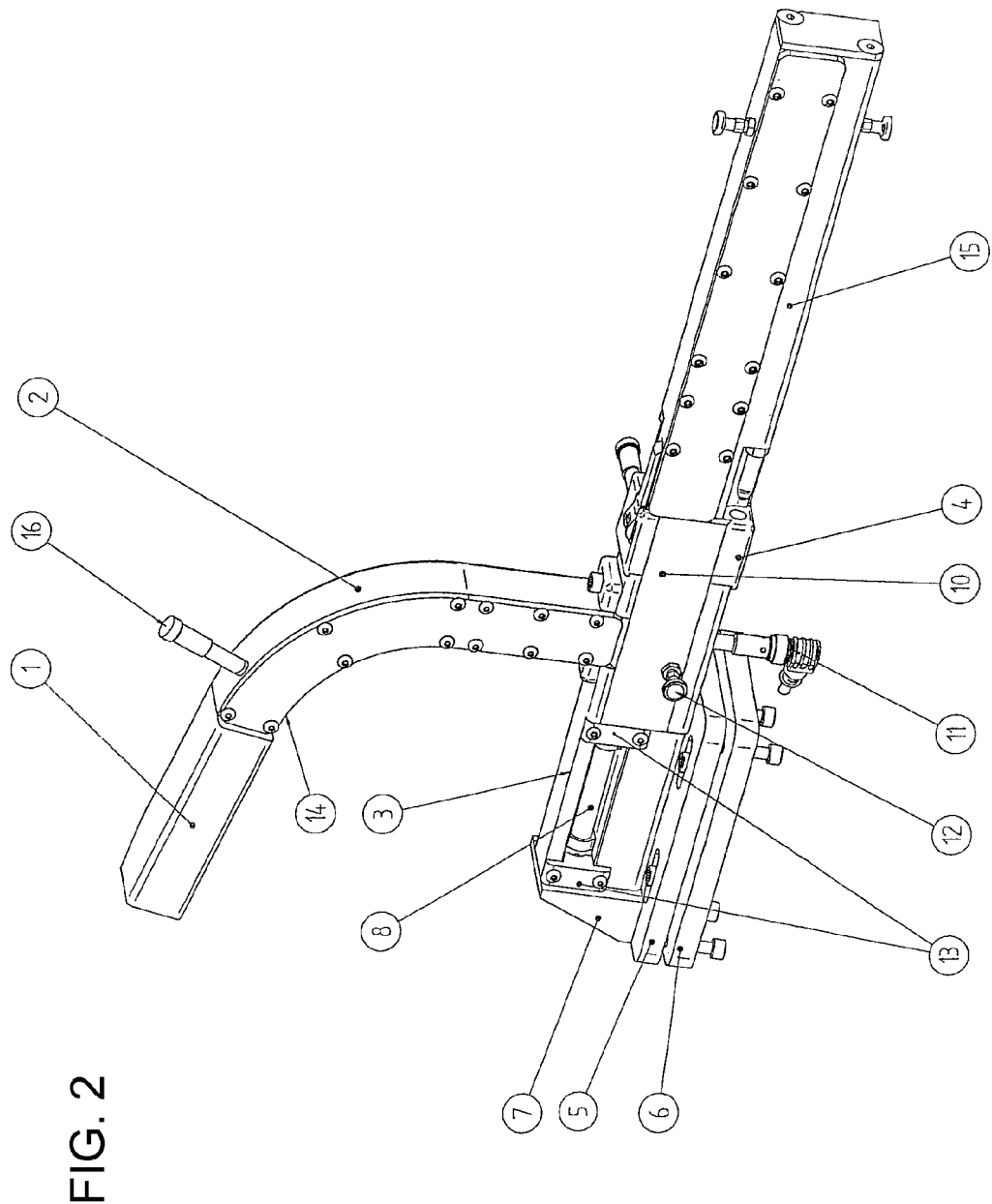
FIG. 2 shows the inventive apparatus 3 in engaged state with magazine 15.
Figure 3:
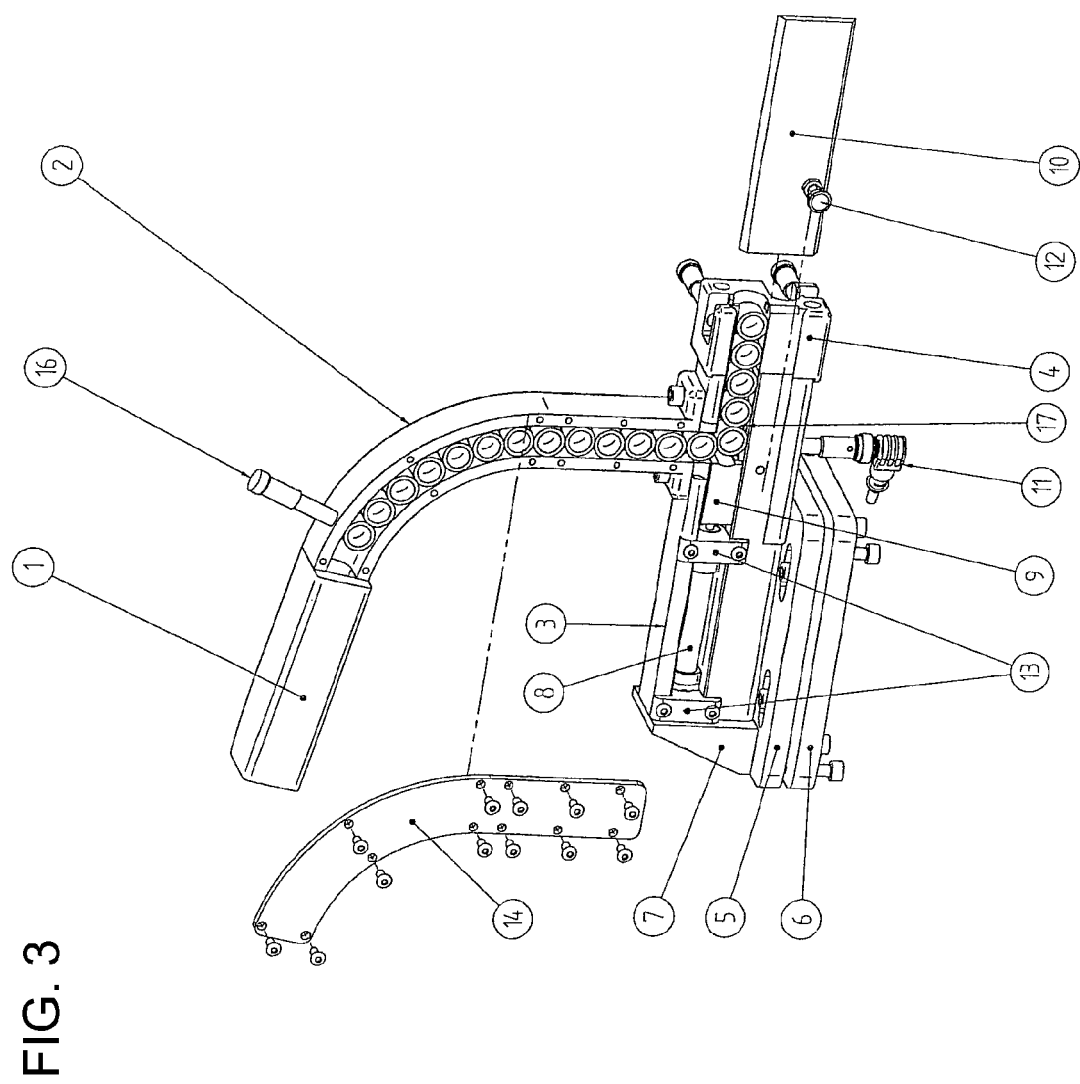
Figure 4:
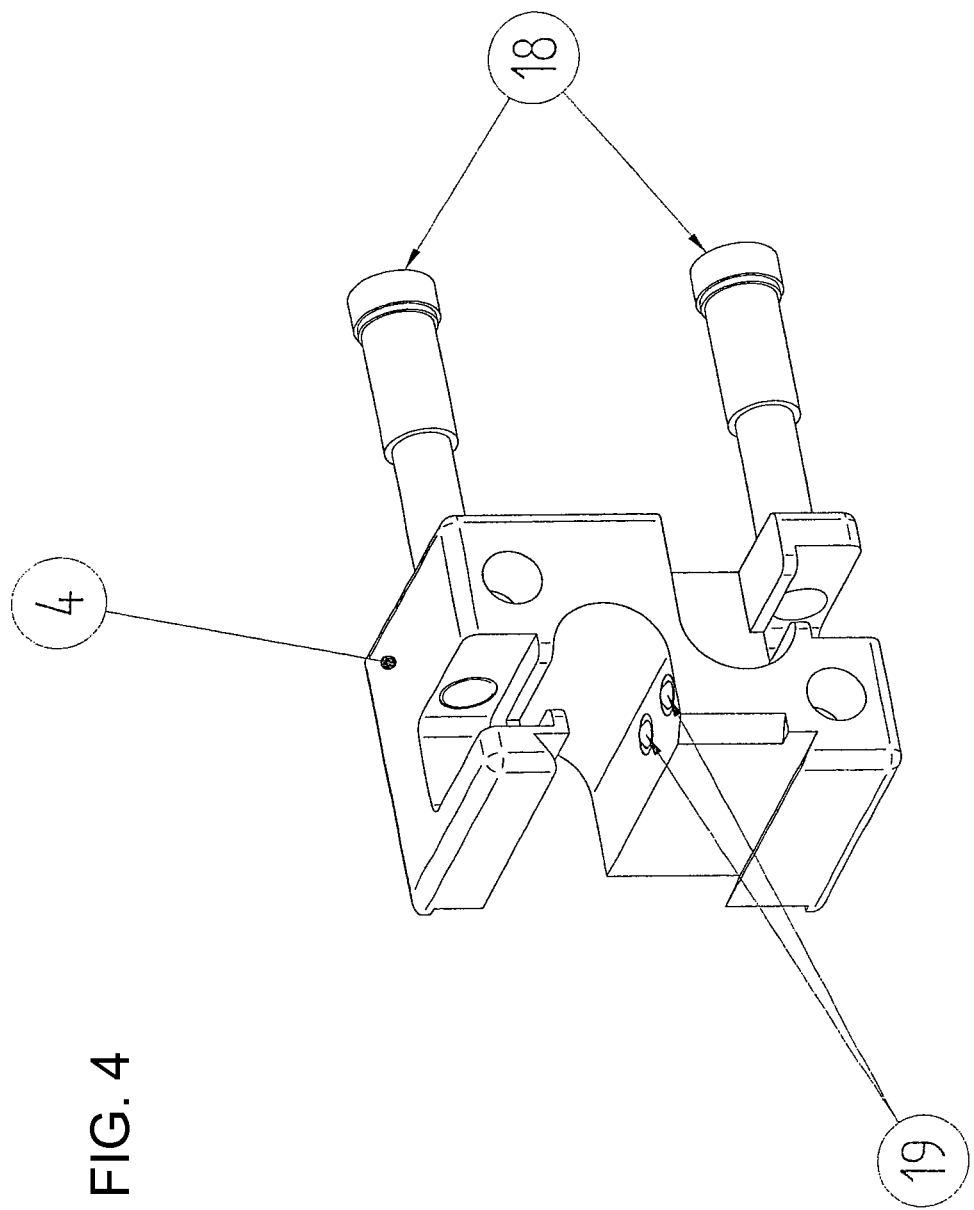
FIG. 4 shows the backside of the magazine connector 14.

The inventive apparatus 3 is comprised of an electrode cap rotating conduit 1, one end of which is connected to a heliconveyor. The heliconveyor pre-positions and transports the electrode caps. At the outlet of the heliconveyor, the electrode caps stand on their drilled front sides.

From this position, the electrode caps are conveyed in a defined position to the electrode cap rotating conduit.

The electrode cap rotating conduit 1 is designed so as to turn the electrode caps by 90° about their Z axis. If possible, the electrode cap rotating conduit 1 is firmly connected with the heliconveyor in order to transmit the vibrations of the heliconveyor to the electrode cap rotating conduit 1 and thus facilitate transport of the electrode caps.

With its other end, the electrode cap rotating conduit 1 is located opposite to the upper end of the guide duct 2.

The electrode cap rotating conduit 1 is aligned in such a way with the guide duct 2 that the vibrations of the heliconveyor are not transmitted to the other system components, and that the outlets of the electrode cap rotating conduit 1 and the guide duct 2 are facing each other so that the electrode caps can be conveyed in a safe manner.

The distance between the electrode cap rotating conduit 1 and the guide duct 2 is such that these subassemblies cannot come into contact with each other even when the heliconveyor is engaged, while at the same time keeping the gap as narrow as possible.

In addition, the guide duct 2 doubles as a buffer for the magazine 15 to be loaded so that a certain amount of electrode caps is available at all times to feed a magazine 15.

The front of the guide duct 2 is covered by a transparent duct window 14, preferably made of acrylic glass.

A sensor 16 is located in the upper area of the guide duct 2. Said sensor 16 serves to monitor the amount of electrode caps present in the guide duct 2. Once the level falls below the desired minimum amount, thus interrupting the signalling pathway to the sensor 16, the heliconveyor activates to feed more electrode caps into the guide duct 2.

The sensor 16 is preferably designed as an inductive sensor.

This guide duct 2, at its lower end, is connected to the magazine loading unit 3, which means that electrode caps are loaded into the magazine loading unit 3 from above via the guide duct 2.

The magazine loading unit 3 has a magazine connector 4 at one end.

The socket of the magazine connector is designed in the same way as the socket used to attach the magazine 15 to a cap changer on the machine side to establish a firm connection between the magazine 15 to be loaded and the magazine connector 4.

The magazine connector 4 houses two locking lever sensors 18 the purpose of which is to detect the correct position of the magazine 15 inside the magazine connector 14. Furthermore, the conduit of the magazine connector 4 holds two ball pressure pieces 19 mounted sequentially in the direction of operation, the purpose of which is to prevent the electrode caps inadvertently dropping out of the magazine connector 4.

The electrode caps are transported through the magazine connector 4 into the magazine 15 to be loaded via a conduit in the guide duct 2 that matches the shape of the electrode caps.

The magazine loading unit 3 holds a sensor 11 below the guide duct 2 which detects the electrode caps dropping out of the guide duct 2.

On the opposite side of the magazine connector 4 is located a cylinder 8, preferably designed as a pneumatic cylinder and fastened inside the magazine loading unit 3 by way of the retainers 13.

Connected with the plunger rod of the cylinder 8, the pressure piece 9 is located between the cylinder 8 and the electrode cap present in the conduit of the magazine loading unit 3. On the contact side the pressure piece 9 has a milled-out portion matching the cap contour.

If an electrode cap is present in front of the pressure piece 9 inside the magazine loading unit 3, it will be detected by the sensor 11, which is preferably designed as an inductive sensor, the cylinder 8 will extend and push the electrode cap through the magazine connector 4 into the magazine 15.

Signal processing and valve control is handled by a control unit preferably located inside the switchbox of the heliconveyor.

In the direction of operation, behind the sensor 11 is mounted a ball pressure piece 17 in such a way that the electrode caps transported through the guide duct 2 will not accidentally move out of position and leave the detection zone of the inductive sensor 11.

The cover panel on the front side of the magazine loading unit 3 is designed as a transparent cover panel 10 preferably made of acrylic glass.

A special variant of the inventive solution has said cover panel designed as a maintenance port.

In this case, the cover panel 10 can be mounted and removed using a dovetail way. The cover panel 10 is located in position with a locking element 12.

This solution allows for the cover panel 10 to be easily removed, permitting a quick response in the case of a breakdown or maintenance without the need for installation work.

The retainer subassembly, comprised of the parts 5, 6 and 7, serves to adjust the cap loading device along all three spatial axes in relation to the heliconveyor.

Some safety-related conditions must be met in order to initiate the magazine loading operation.

1. The sensor 11 must detect a cap to ensure that an electrode cap is present directly in front of the pressure piece 9.
2. The two sensors 18 must detect the locking levers of the magazine 15 to ensure that a magazine 15 is present in the proper position at the magazine connector 4.
3. If conditions 1 and 2 are met, a switch provided as starting requirement and preferentially designed as a foot switch, must be actuated to ensure that the system is turned on intentionally.

Once conditions 1 to 3 are met, the electrode caps will be pushed into the magazine 15. When the magazine 15 is fully loaded, the cylinder 8 will not reach its far end position. This is signalled by a limit contact located on the cylinder 8, resulting in the loading process being broken off by the control system.

Initiating another loading process requires the foot switch to be operated again, and conditions 1 and 2 to be met.

If the magazine 15 is employed with two ducts, each duct of the magazine 15 are loaded separately to ensure that both ducts of a magazine 15 are loaded, in other words: the first magazine duct is loaded, the magazine is rotated 180° about its X axis and then reset, and the process is resumed to load the second duct.

LIST OF REFERENCE SIGNS

1 Electrode cap rotating conduit
2 Guide duct
3 Magazine loading unit
4 Magazine connector
5 Retainer subassembly
6 Retainer subassembly
7 Retainer subassembly
8 Cylinder
9 Pressure piece
10 Magazine window
11 Cap detector
12 Locking element
13 Retainer
14 Duct window
15 Magazine
16 Loading level sensor
17 Ball pressure piece
18 Locking lever sensor
19 Ball pressure piece

The invention claimed is:

1. An apparatus for loading magazines with electrode caps for welding electrodes, comprising;
    an electrode cap rotating conduit having a first end and a second end and being configured to rotate the electrode caps by 90° about a Z axis thereof;
    a heliconveyor connected to said first end of said conduit, said heliconveyor having an outlet for the electrode caps;
    a guide duct having an upper end adjoining said second end of said conduit such that vibrations of said heliconveyor are not transmitted to other system components;

a magazine loading unit connected to a lower end of said guide duct and having a magazine connector on a side facing a magazine to be loaded, said magazine connector matching a socket for fastening the magazine to be loaded;

said magazine connector having locking lever sensors for detecting a correct position of the magazine inside said magazine connector, and two ball pressure pieces inside a conduit of said magazine connector aligned in a direction of operation;

said magazine loading unit having a sensor below said guide duct for detecting electrode caps dropping out of said guide duct;

a cylinder disposed in said magazine loading unit on a side opposite said magazine connector and a retainer holding said cylinder;

a pressure piece connected to a plunger shaft of said cylinder, said pressure piece being disposed between said cylinder and electrode caps that are present in a conduit of said magazine loading unit; and a further ball pressure piece disposed behind said sensor in the direction of operation so as to prevent the electrode caps transported from said guide duct from accidentally moving out of position and leaving a detection zone of said sensor.

2. The apparatus according to claim 1, further comprising a retainer sub-assembly for securing the apparatus in place and configured to allow said magazine loading unit to be moved along three spatial axes in relation to said heliconveyor.

3. The apparatus according to claim 1, wherein said electrode cap rotating conduit is rigidly attached to said heliconveyor.

4. The apparatus according to claim 1, wherein said electrode cap rotating conduit is connected with said guide duct and configured to prevent the vibrations of the heliconveyor from being transmitted through the components of the system.

5. The apparatus according to claim 1, comprising a transparent duct window covering a front side of said guide duct.

6. The apparatus according to claim 5, wherein said transparent duct window is made of acrylic glass.

7. The apparatus according to claim 1, comprising a transparent front cover covering said magazine loading unit.

8. The apparatus according to claim 7, wherein said transparent cover is made of acrylic glass.

9. The apparatus according to claim 7, comprising a locking element holding said transparent front cover in place.

10. The apparatus according to claim 1, wherein a front opening of said magazine loading unit is a maintenance port.

11. The apparatus according to claim 1, wherein a front opening of said guide duct is a maintenance port.

12. The apparatus according to claim 1, wherein said sensors are inductive sensors.

13. The apparatus according to claim 1, wherein said cylinder is a pneumatic cylinder.

14. The apparatus according to claim 1, wherein said pressure piece is formed with a milled-out portion on a contact side with the electrode cap and said milled-out portion having a contour matching a cap contour.

15. The apparatus according to claim 1, which comprises a control unit for signal processing and valve control, said control unit being disposed in a switch box of said heliconveyor.

* * * * *